United States Patent [19] [11] 4,067,541
Hunter [45] Jan. 10, 1978

[54] WATER VALVE OPERATING SOLENOID

[75] Inventor: Edwin J. Hunter, Rancho Sante Fe, Calif.

[73] Assignee: The Toro Company, Minneapolis, Minn.

[21] Appl. No.: 670,983

[22] Filed: Mar. 26, 1976

[51] Int. Cl.[2] .......................... F16K 31/06; H01F 7/08

[52] U.S. Cl. .................................... 251/129; 251/141; 335/260

[58] Field of Search ........................ 251/129, 141, 139; 335/260, 278

[56] References Cited

U.S. PATENT DOCUMENTS

| | | | |
|---|---|---|---|
| 3,307,129 | 2/1967 | Mangiafico | 335/260 X |
| 3,420,260 | 11/1969 | Wisniewski | 251/141 X |
| 3,598,360 | 8/1971 | Merriner | 251/129 |
| 3,630,482 | 12/1971 | Beller | 251/129 X |
| 3,929,315 | 12/1975 | Rieth | 251/129 |

*Primary Examiner*—Arnold Rosenthal
*Attorney, Agent, or Firm*—Poms, Smith, Lande & Glenny

[57] ABSTRACT

A water valve operating solenoid is disclosed having a unitary housing including a relatively thin plunger tube and a threaded nipple and formed of a non-magnetic plastic material. A coil bobbin having inner reinforcing sleeves is positioned around the plunger tube with a split sleeve bobbin cover positioned around the bobbin. Split washers are positioned at both ends to concentrate the flux path.

11 Claims, 3 Drawing Figures

WATER VALVE OPERATING SOLENOID

BACKGROUND OF THE INVENTION

The present invention relates to solenoids and more particularly to a water valve operating solenoid having a unitary housing.

Various prior art devices have been used to control the flow of water. Such devices are typically solenoid operated and arranged within a control valve system wherein fluid supplied to the inlet of the main control valve is employed in a pilot control system to cause the main valve to open or to close, or to maintain a partly open position.

These prior art valves typically include a solenoid for magnetically displacing a movable armature to control the flow of fluid through a vent port of a pilot valve. When the pilot valve is open, fluid flows from an actuating chamber through the vent port and into an outlet chamber. The pilot valve may be closed by opening the circuit to the solenoid coil to allow an associated spring to displace the armature and thereby close the vent port.

Prior art solenoids for controlling fluid flow have typically been formed of a housing manufactured of stainless steel non-magnetic material with an epoxy coating to prevent rusting.

A separate plunger tube is typically secured to the housing. A threaded nipple enables the housing and the plunger tube to be secured to the valve system. The plunger tube must be capable of withstanding a wide range of water pressures in the course of the operation of the solenoid valve. It must also be formed of a non-magnetic material so as not to interfere with the flux in the area.

These prior art devices have proven to be excessively expensive. In particular, the construction of the device having a separate non-magnetic stainless steel plunger tube including a brass nipple is costly.

SUMMARY OF THE INVENTION

The object of the present invention is to provide a low cost water valve operating solenoid. To attain this, the water valve operating solenoid includes a unitary housing including a relatively thin plunger tube and a threaded nipple formed of a non-magnetic material. The plunger tube is relatively thin to reduce the air gap in the magnetic flux path set up by the solenoid. The housing is preferably injection molded and formed of a high density polyethylene to provide the unitary construction.

A coil bobbin or spool having metal inner sleeves is mounted around the plunger tube and insulating tape is wound around the coil. The inner sleeves provide additional support for the thin wall inner tube and also concentrate the flux to insure optimum utilization of the flux for displacing the armature.

Washer rings are mounted at both ends of the coil bobbin and the inner sleeves protrude out of the ends of the coil bobbin and contact the split washers which, in turn, contact a split sleeve around the coil bobbin to concentrate the flux path and provide further support for the coil bobbin. The entire housing is filled with a suitable potting epoxy compound.

In the operation of the solenoid valve when an electrical current is provided through suitable leads to the solenoid coil and a magnetic field is set up, the armature which is fitted in the thin plunger tube is displaced to open a water port. The plunger tube is then subjected to water pressure which it is capable of withstanding with the aid of the inner sleeves of the coil bobbin.

Accordingly, an object of the present invention is to provide means for operating a water valve.

Another object is to provide water valve means, including a unitary housing construction.

Yet another object is to provide means for housing a water valve including a unitary housing having a plunger tube and a threaded nipple.

Other objects, advantages, and novel features of the present invention will become apparent from the following detailed description of the invention when considered in conjunction with the accompanying drawings.

SUMMARY OF THE INVENTION

Figures 1, 2, 3:
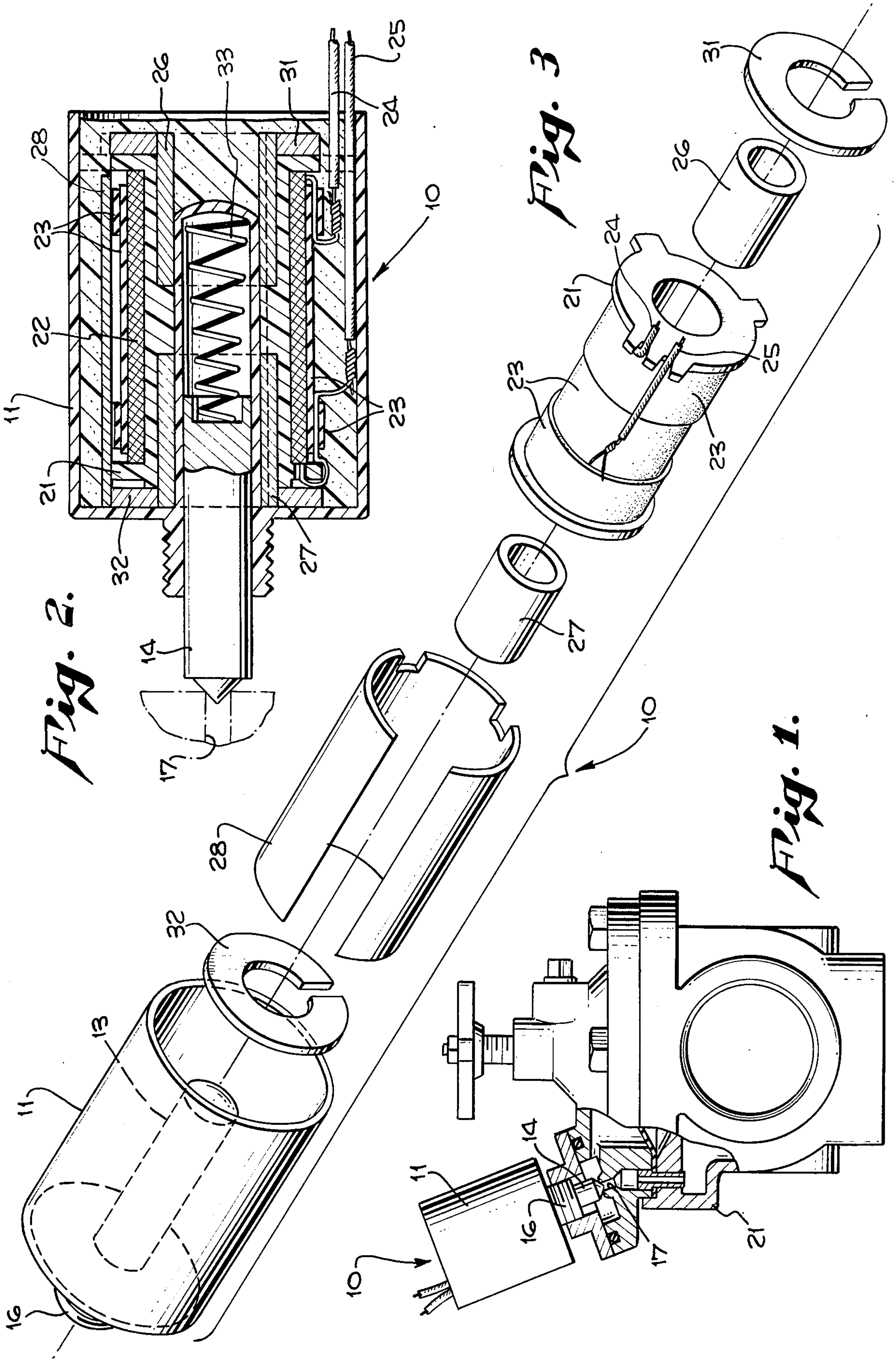
FIG. 1 is a view of the solenoid of the present invention mounted to a water valve and with portions broken away.
FIG. 2 is a cross-sectional view of the solenoid of the present invention.
FIG. 3 is an exploded perspective view of the solenoid assembly of the present invention.

Referring to FIG. 1 there is shown the solenoid 10 of the present invention having a unitary housing means 11 secured to a water valve system 12. In the preferred embodiment, the unitary housing 11 is formed of a non-magnetic plastic material and includes a thin wall inner tube 13 shown in FIGS. 2 and 3 to enable an armature 14 to be displaced therein.

The unitary housing 11 includes a threaded nipple 16 for securing the unitary housing means to the control valve system to enable the armature 14 to control the flow of fluid through a vent port 17 to thereby control the operation of the water valve 12.

Coil bobbin means 21 is provided within the unitary housing 11 and around the inner tube 13 for providing magnetic flux to displace the armature 14. In the preferred embodiment, the coil bobbin includes a spool 22 of electrical wire which provides magnetic flux in response to an electrical signal. The wire is covered with insulating tape 23 and includes leads 24 and 25 through which the electrical signal is applied. In the preferred embodiment, the coil bobbin 21 is made of a suitable polymer and the spool has approximately 1900 turns of 33 gauge wire. The insulating tape is formed of a 1-inch wide strip over which two ¼-inch wide strips are wrapped.

Metallic reinforcing means are positioned concentrically within the coil bobbin 21 for providing reinforcement of the thin wall 13 against fluid pressure. In the preferred embodiment this is shown as inner sleeves 26 and 27 which provide the additional support for the thin walled inner tube 13 and also concentrate the flux generated by the spool of wire 22 of the coil bobbin 21 to insure optimum utilization of the flux.

Split sleeve metallic bobbin cover means is provided and in the preferred embodiment is shown as split sleeve 28 which provides a cover to the bobbin means and also concentrates the magnetic flux generated by the spool 22 wrapped around the coil bobbin means 21. It is formed of any suitable metallic substance such as steel.

Washer ring means is provided and in the preferred embodiment shown as washer rings 31 and 32 positioned at each end of the coil bobbin means 21 and snug fit thereto to concentrate the magnetic flux. The washer rings are formed of a suitable metallic substance and are snug fit within the split ring bobbin cover 28. The inner sleeves 26 and 27 protrude out of the ends of the coil bobbin means 21 to contact the split washer rings 31 as shown in FIGS. 2 and 3 to complete the magnetic flux path.

The unitary housing 11 is charged with a premeasured amount of epoxy before the assembled coil bobbin means as well as the inner sleeves 26 and 27, the split sleeve bobbin cover 28 and the washer rings 31 and 32 are pressed into the housing. The epoxy, when set, holds the assembled parts together, protects them from corrosion, and further provides insulation.

In the operation of the solenoid, when a suitable electrical signal is applied to the leads 24 and 25 to thereby energize the spool of wire 22, a magnetic field is set up and the flux is concentrated by the metallic bobbin cover 28, the washers 31 and 32 and the inner sleeves 26 and 27. The magnetic flux causes a displacement of the armature 14 to open port 17 and allow the flow of fluid through the port 17 to operate the valve and thereby control the flow of fluid through the water system controlled by the pilot valve 12. When the port 17 is thus open to permit fluid to flow therethrough, the inner tube 13 is exposed to fluid pressure. The inner sleeves 26 and 27 provide reinforcement for the thin wall inner tube 13 against the fluid pressure. Opening the electrical circuit to the solenoid will allow spring 33 to return the armature 14 to the closed position of FIG. 2.

It will be appreciated by those skilled in the art that many modifications and variations of the present invention are possible in light of the above teachings. It is therefore to be understood that within the scope of the appended claims, the invention can be practiced otherwise than as specifically described.

I claim:

1. A water valve operating solenoid having an armature for controlling the flow of fluid through a port comprising:

unitary housing means formed of a nonmagnetic plastic material and having a thin wall inner tube formed to enable the armature to be displaced therein, and coil bobbin means secured within said unitary housing means and around said inner tube and including means for providing magnetic flux in response to an electrical signal to displace said armature to thereby control the flow of fluid through the port.

2. The device as described in claim 1 and wherein said port opens to a chamber whereby the flow of fluid through said port exposes said inner tube to fluid pressure and further including:

metallic reinforcing means positioned concentrically within said coil bobbin means for providing reinforcement for said thin wall against said fluid pressure.

3. The device as described in claim 2 and wherein said unitary housing means includes a threaded nipple.

4. The device as described in claim 3 and wherein said coil bobbin means has insulating tape wrapped therearound and further including:

split sleeve metallic bobbin cover means positioned therearound to cover said bobbin means and concentrate said magnetic flux generated by said coil bobbin means.

5. The device as described in claim 4 and further including:

washer ring means positioned at each end of said coil bobbin means and snug fit within said bobbin cover for concentrating said magnetic flux.

6. The device as described in claim 5 and wherein said unitary housing means including said coil bobbin means is filled with a premeasured charge of epoxy for retaining said coil bobbin means in said unitary housing and for further providing insulation.

7. A solenoid having an armature and a coil bobbin having a central axial bore and an electrical conductor wound thereabout, comprising:

housing means formed of a non-magnetic material providing a cavity receiving said coil bobbin and including an inner tube portion of such non-magnetic material extending into said cavity and into said bobbin bore, said tube having an open end opening outwardly of said housing to receive said armature therein; and means for providing a magnetic flux path within said non-magnetic housing and about said bobbin for concentrating magnetic flux of said electrical conductor to displace said armature within said non-magnetic material tube when electrical current is passed through said conductor.

8. The solenoid of claim 7 wherein said means for providing a magnetic flux path within said housing comprises a metal sleeve positioned about said non-magnetic tube within said bobbin bore.

9. A solenoid as in claim 7 wherein said means for providing a magnetic flux path within said housing comprises:

magnetic sleeve means positioned about said bobbin and within said housing for concentrating the flux path of said conductor about said bobbin and within said non-magnetic housing.

10. A solenoid as in claim 9 wherein said means for providing a magnetic flux path within said housing further comprises:

magnetic ring means positioned at each end of said coil bobbin and within said housing means for concentrating said magnetic flux in the path between said sleeve means and said armature.

11. A solenoid as in claim 7 comprising:

means for retaining said coil bobbin and means for providing a magnetic flux path in said housing including an epoxy material filling said cavity within said housing means about said bobbin and means for providing a magnetic flux path.

* * * * *